July 3, 1962 K. O. OTOUPALIK 3,042,087
CHAIN SAW PROTECTIVE SHEATH
Filed Jan. 19, 1960
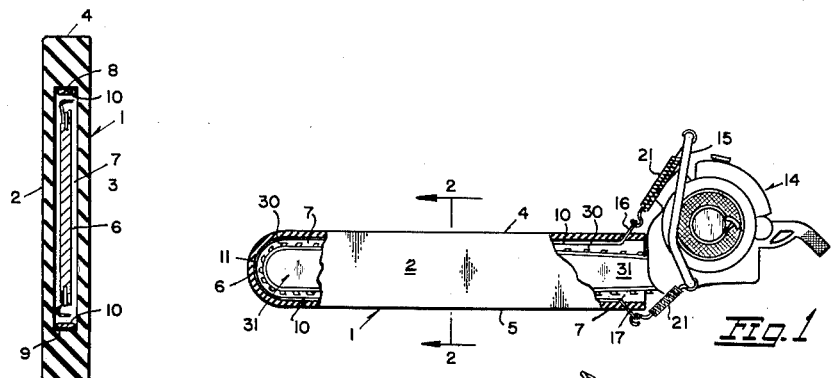
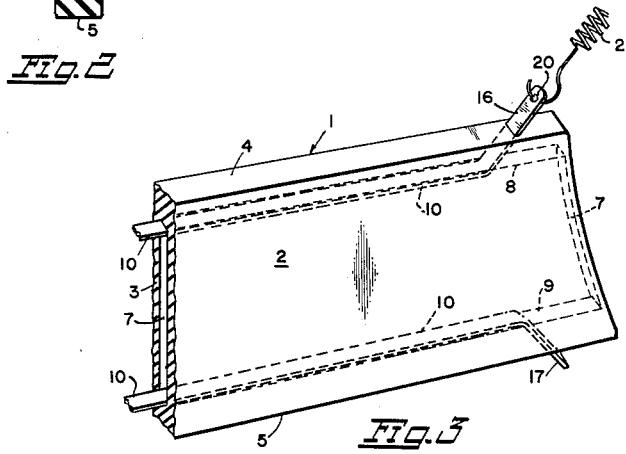
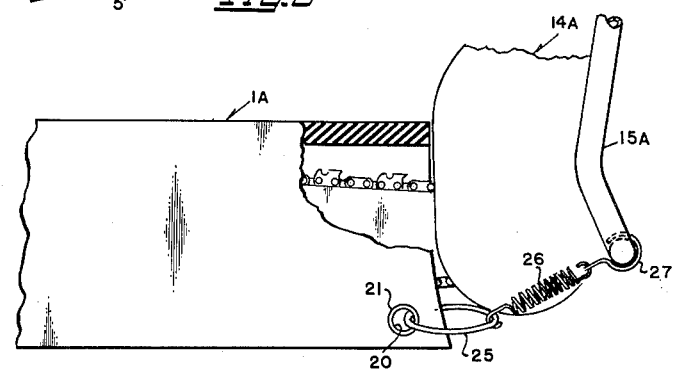
KAMILLE O. OTOUPALIK
INVENTOR.
BY James L. Girnan
ATTY

United States Patent Office 3,042,087
Patented July 3, 1962

3,042,087
CHAIN SAW PROTECTIVE SHEATH
Kamille O. Otoupalik, P.O. Box 146, Missoula, Mont.
Filed Jan. 19, 1960, Ser. No. 3,447
2 Claims. (Cl. 143—32)

This invention relates to a protective sheath for a power-driven chain saw.

One of the principal objects of the invention is to provide a sheath of the character described which may be advantageously made of neoprene, plastic, fibre glass, metal or other suitable material and provided on its interior with means for preventing the teeth of the saw from cutting or digging into internal adjacent edges or surfaces of the sheath during the sheathing and unsheathing of the saw, and which will in fact facilitate these operations.

Another object of the invention is the utilization of the preventative means, above referred to, for adding desirable stiffness to the sheath to facilitate its application to and withdrawal from the saw while at the same time serving as means for attaching the sheath to the power unit of the chain saw.

A further object of the invention is the provision for an efficient, light weight, durable and inexpensive protective shield for protecting the saw chain and saw bar during transportation in trucks, automobile trunks, trailers, and the like, from damage resulting from being bent, twisted, nicked or dirt encrusted, all of which lead to expensive repairs or replacement of parts.

The foregoing and other objects and advantages which will become subsequently apparent reside in the details of construction and operation as more fully hereinafter described and claimed, reference being had to the accompanying drawing forming a part hereof and in which:

FIGURE 1 is a side elevational view of a protective sheath made in accordance with my invention, shown applied to a chain saw and saw bar, and with fragments broken away for clearness of illustration.

FIGURE 2 is a sectional end elevational view taken along the line 2—2 of FIGURE 1.

FIGURE 3 is a fragmentary perspective view of the rearward end portion of the sheath on an enlarged scale, and FIGURE 4 is a fragmentary side elevational view of a modified form of the invention.

With continuing reference to the drawing, and particularly FIGURES 1-3 thereof, reference numeral 1 indicates generally the main body of the sheath made of neoprene or other flexible material and which comprises side walls 2 and 3, top and bottom walls 4 and 5 and a rounded end wall 6 laterally and vertically spaced apart, as best shown in FIGURE 2, to provide a pocket 7 of sufficient size to fit the average size of saw bar and chain saw carried by the bar.

For protecting the internal top and bottom surfaces 8 and 9 of the pocket and adjacent surfaces thereof from being damaged by the saw teeth, as above pointed out, I provide a lining in the form of an elongated strip 10 of spring steel turned back on itself as at 11 to fit the interior of the rounded end wall 6 and to bear upwardly and downwardly, respectively, against the internal top and bottom surfaces 8 and 9 of the top and bottom pocket forming walls 4 and 5. An additional feature of this construction is that the expansion forces of the thus bent spring steel material provide rigidity throughout the length of the sheath to facilitate its application to and removal from the saw bar and chain saw.

Another unique feature of this protective and stiffening construction is the means provided by the steel strip 10 for attaching the rearward end of the sheath to the power unit 14 (FIGURE 1) of the chain saw usually provided with a surrounding handle bar 15. To accomplish this, I bend the top and bottom rearward ends 16 and 17 of the steel strip upwardly and downwardly, respectively, as shown, and provide an aperture 20 in each of their ends for attachment to one end of tension springs 21 whose opposite ends may be conveniently attached in hooked engagement with the handle bar 15.

In the modified form of the invention shown in FIGURE 4, I dispense with the stiffening strip 10 and provide the bottom rearward corner of the sheath 1A with an aperture 20 extending entirely therethrough and suitably grommetted as at 21. A ring 25 extends through the aperture 20 for attachment to one end of a tension spring 26 whose opposite end may be conveniently attached in hooked engagement as at 27 with the handle bar 15A of the power unit 14A.

From the foregoing it will be apparent that I have provided a protective sheath for a chain saw 30 and its saw bar 31 wherein the interior of the sheath is protected from the cutting or nicking action of the saw teeth and wherein the protective means serves additional purposes of attaching the sheath to the power unit of the saw and facilitates the sheathing and unsheathing of the saw bar and saw chain.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

1. A protective sheath for a chain saw driven by a power unit and having a cutting peripheral portion, said peripheral portion having a round forward end and opposite substantially straight sides extending rearwardly from said round forward end, said sheath comprising elongated side walls top and bottom walls and a rounded end wall all spaced apart to provide a pocket therewithin, a lining for said top, bottom, and rounded end walls, said lining comprising a unitary strip of steel disposed within said pocket bearing against said top and bottom walls and against said rounded end wall, said strip extending rearwardly, bent upwardly and extending outwardly from the sheath, near the rearward end thereof, and resilient means attached at one of its ends to said extended ends of said lining and adapted at its opposite end for engagement with the power unit of the chain saw.

2. A protective sheath for a chain saw driven by a power unit and having a cutting peripheral portion, said peripheral portion having a round forward end and opposite substantially straight sides extending rearwardly from said round forward end, said sheath comprising elongated side walls, top and bottom walls and a rounded end wall all spaced apart to provide a pocket therewithin, a unitary strip of flat spring material bent back on itself in substantial U-shape with the leg portions thereof spring urged outwardly and thereby bearing against said top and bottom walls and against said rounded end wall to thereby provide stiffness to the sheath to facilitate sheathing and unsheathing operations, the ends of said leg portions extending respectively upwardly and downwardly through said top and bottom walls near end of the sheath, and resilient means attached at one of their ends to said extended ends of said leg members and adapted at their opposite ends for attachment to the power unit of the chain saw.

References Cited in the file of this patent

UNITED STATES PATENTS

| | | |
|---|---|---|
| 757,740 | Happe | Apr. 19, 1904 |
| 831,770 | Bragg | Sept. 25, 1906 |
| 831,771 | Bragg | Sept. 25, 1906 |
| 2,638,944 | Woleslagle | May 19, 1953 |
| 2,826,298 | Nicodemus | Mar. 11, 1958 |

FOREIGN PATENTS

| | | |
|---|---|---|
| 776,867 | France | Nov. 17, 1934 |
| 24,097 | Great Britain | July 22, 1909 |